United States Patent
Miyazawa

[11] Patent Number: 5,152,672
[45] Date of Patent: Oct. 6, 1992

[54] ROTARY PUMP WITH PRESSURE SWITCH

[75] Inventor: Shigeyuki Miyazawa, Saitama, Japan

[73] Assignee: Jidosha Kiki Co., Ltd., Tokyo, Japan

[21] Appl. No.: 773,179

[22] Filed: Oct. 8, 1991

[30] Foreign Application Priority Data

Oct. 15, 1990 [JP] Japan .............................. 2-106884[U]

[51] Int. Cl.⁵ .............................................. F04B 21/00
[52] U.S. Cl. ........................................ 417/63; 417/43; 200/82 R
[58] Field of Search ................. 417/63, 43; 200/82 R, 200/83 R

[56] References Cited

U.S. PATENT DOCUMENTS 3,077,524 2/1963 Blackburn ........................ 200/82 R
3,668,349 6/1972 Dochesneau et al. ............. 200/82 R

FOREIGN PATENT DOCUMENTS

3837087 5/1989 Fed. Rep. of Germany ........ 417/63
63-127045 8/1988 Japan .
63-164588 10/1988 Japan .

Primary Examiner—John J. Vrablik
Assistant Examiner—Charles Freay
Attorney, Agent, or Firm—Townsend and Townsend

[57] ABSTRACT

In a rotary pump with a pressure switch, a pressure switch mounting space constituted by a small- and large-diameter holes is formed to be parallel to a rotating shaft in an end face portion of a front body to which a rear body is not joined. A pump outlet side fluid pressure is introduced to an inner end of the small-diameter hole. The large-diameter hole is connected to a pump inlet side. A plunger is slidably arranged in the small-diameter hole. The plunger is normally biased toward the inner end of the small-diameter hole and is kept movable toward the large-diameter hole depending on a magnitude of the fluid pressure of the pump outlet side. A pressure detector is operated when the fluid pressure of the pump outlet side exceeds a predetermined value. The pressure detector includes a terminal arranged in the large-diameter hole and having an inner end opposing an end portion, of the plunger, located in the large diameter hole, and an outer end connected to a lead from a switch circuit, and a holding member for holding the terminal at an open end portion of the pressure switch mounting space while keeping the terminal insulated. Removal of a thermal holding member in the mounting spacer is prevented by the gasket plate inserted between the two bodies.

15 Claims, 6 Drawing Sheets

ROTARY PUMP WITH PRESSURE SWITCH

BACKGROUND OF THE INVENTION

The present invention relates to a rotary pump which incorporates a pressure switch for detecting a fluid pressure variation on the pump outlet side and transmitting a detection signal.

For example, in a power steering apparatus for reducing the steering force for a vehicle, a pressure sensor is arranged in a conventional oil pump or in a pipe extending from the outlet of the pump. This pressure switch serves as a sensor for detecting an abrupt increase in oil pressure in a hydraulic circuit extending from the oil pump during a steering operation, thus increasing the idling speed of the engine to prevent an engine failure. As pressure switches of this type, switches having various structures are disclosed in, e.g., Japanese Utility Model Laid-Open Nos. 57-161840, 59-43039, and 62-57355.

More specifically, a pressure switch of this type generally includes a main body constituted by a cylindrical conductive member, a terminal embedded in one end portion of the main body to be kept insulated, and a plunger which is slidably supported in the main body and is normally biased by a spring or the like in a direction to separate from the terminal. When the oil pressure of the high-pressure side of the above-mentioned hydraulic circuit is introduced to the other end side of the plunger, and the pressure exceeds a preset pressure, the plunger is moved to the terminal connected to the atmospheric pressure. With this operation, the conductive plunger is brought into direct contact with the terminal or a conductive member is brought into indirect contact with the terminal to electrically turn on the switch, thus performing a required control operation using the resulting electrical signal.

The above-described pressure switch is generally arranged in the pump body of an oil pump as a fluid pressure source, e.g., a rotary pump such as a vane pump. This is the simplest method of arranging the pressure switch. For example, a pump having such an arrangement is disclosed in, e.g., Japanese Utility Model Laid-Open No. 63-127045. In this pump, the following components are sequentially mounted in a stepped hole formed in one end portion of the pump body: a plunger having an inner end opposing the high-pressure side, a spring retainer, a spring, a terminal opposing a plunger end portion, a plug nut fastened to the open end portion of the stepped hole to hold the terminal, and the like.

According to such an arrangement, the number of components can be decreased and a pressure switch portion protruding from the pump body side can be minimized as compared with a general arrangement in which a screw portion formed on the main body of a pressure switch separately assembled as a unit in advance is threadably engaged with a screw hole on the pump body side so as to fix the pressure switch. With this arrangement, therefore, a reduction in size and cost of the pump can be achieved.

According to the conventional structure described above, however, the pressure switch is mounted horizontally to be perpendicular to the axis of the pump regardless of the positions of a vane, a rotor, and the like as the rotating elements of the pump. For this reason, a pressure switch portion protruding to a body side portion is large, and the pressure switch tends to interfere with a vehicle bracket. Therefore, the mounting position of a pressure switch must be changed for each vehicle, requiring cumbersome operations. In addition, the number of components is large, and there is still room for improvement in its structure. Furthermore, in the conventional structure described above, since a member for holding the terminal is fixed to the pump body by using screw parts and the like, a threading operation and the like are required, posing problems in terms of practical use. Under the circumstances, demands have arisen for some measure to ensure excellent workability, facilitate the assembly of a pressure switch in a pump body, and achieve a great reduction in cost.

SUMMARY OF THE INVENTION

It is an object of the present invention to provide a simple rotary pump with a pressure switch, which allows a reduction in size of a pump.

It is another object of the present invention to provide a rotary pump with a pressure switch, which can improve workability and assembly performance to realize a great reduction in cost.

In order to achieve the above objects, according to the present invention, there is provided a rotary pump with a pressure switch, in a pump body constituted by a front body having one end face to which a storage space for storing a pump rotating element is open, the front body receiving a rotating shaft for driving the pump rotating element so that the rotating shaft extends through the front body, and a rear body mounted on one end face of the front body through a gasket plate to seal the storage space, wherein a pressure switch mounting space constituted by small- and large-diameter holes is formed in an end face portion of the front body to which the rear body is not joined, so as to extend along an axial direction to be parallel to the rotating shaft, the small-diameter hole receiving a fluid pressure of a pump outlet side at an inner end thereof, and the large-diameter hole being continuous with the small-diameter hole and connected to a pump inlet side, a plunger is slidably held in the small-diameter hole of the mounting space such that the plunger is normally biased toward the inner end of the small-diameter hole and is slidably held to be movable toward the large-diameter hole depending on a magnitude of a fluid pressure of the pump outlet side, a terminal having an inner end opposing a plunger end portion located on the large-diameter side and an outer end connected to a lead line from a switch circuit, is held at an open end portion of the pressure switch mounting space by a holding member consisting of an insulating material so as to be kept insulated, and removal of the terminal holding member arranged in the mounting space is prevented by the gasket plate inserted between the two bodies.

In addition, according to the present invention, the pressure switch mounting space in the front body is sealed by a press portion formed at a portion of the rear body so as to prevent removal of the terminal holding member.

According to the present invention, when a pump is to be assembled, a pump rotating element is mounted in a pump storage space open to an end face of a front body, and a plunger is mounted in a small-diameter hole in a pressure switch mounting space extending in the axial direction to be parallel to the rotating element. In addition, a biasing means for biasing the plunger is mounted in a large-diameter hole in the mounting space, and an insulating holding member for holding a terminal is mounted/arranged at an open end portion of the mounting space. Thereafter, a rear body is mounted on the front body directly or through a gasket plate, so that the open end portion of the pressure switch mounting space is sealed by the gasket plate or the rear body, and removal of the holding member is prevented by the gasket plate or the rear body. With this operation, a pressure switch can be assembled. Subsequently, a lead may be connected to the outer end of the terminal. Furthermore, according to the present invention, when the plunger is moved with a variation in pump outlet side fluid pressure and is brought into contact with the terminal, a predetermined pressure switch signal can be obtained.

DESCRIPTION OF THE PREFERRED EMBODIMENTS

The present invention will be described in detail below with reference to the embodiments shown in the accompanying drawings.

FIGS. 1 to 4 show a rotary pump with a pressure switch according to an embodiment of the present invention. This embodiment exemplifies a vane pump. The schematic arrangement of a vane pump denoted by reference numeral 10 as a whole will be described first with reference to FIGS. 1 to 4. The pump 10 comprises a front body 11 and a rear body 12, which constitute a pump body. A pump storage space 20 is formed in the front body 11 to store a pump cartridge 15 and the like. The pump cartridge 15 is constituted by a rotor 13 which is open to an end face on the joining side and has a vane 13a, and a cam ring 14 having an inner cam surface 14a which assumes an elliptic shape when the rotor 13 is stored in the cam ring 14. A pair of pump chambers (not shown) are formed by the inner cam surface 14a. A pump outlet side pressure chamber 17 is formed in a deep portion of the storage space 20. A fluid from the outlet side of the pump chambers is supplied to the pump outlet side pressure chamber 17 through an outlet side path 16a, of a pressure plate 16, arranged in the pump storage space 20 to be adjacent to the cam ring 14. In addition, a flow control valve 18, a rotating shaft 19, and the like are arranged in the front body 11. The flow control valve 18 controls a pump outlet side fluid supplied from the pump chambers to an output port (not shown) through the pump outlet side pressure chamber 17 to flow at a predetermined flow rate. The rotating shaft 19 has one end protruding outside and is designed to be rotated by an external driving source.

In both the bodies 11 and 12, pump inlet side paths 22 and 23 are formed to guide an inlet side fluid from an inlet port 21 to the pump chambers in the pump cartridge 15. In addition, a gasket plate 24 (see FIG. 3) constituted by a thin metal plate having an inner edge on which a seal member 24a is integrally formed by baking or the like is integrally coupled between the bodies 11 and 12 with fastening bolts (see FIG. 2). As is apparent from FIG. 1, the vane pump 10 has components other than those described above. However, since these components are known, a description thereof will be omitted.

Figure 1:
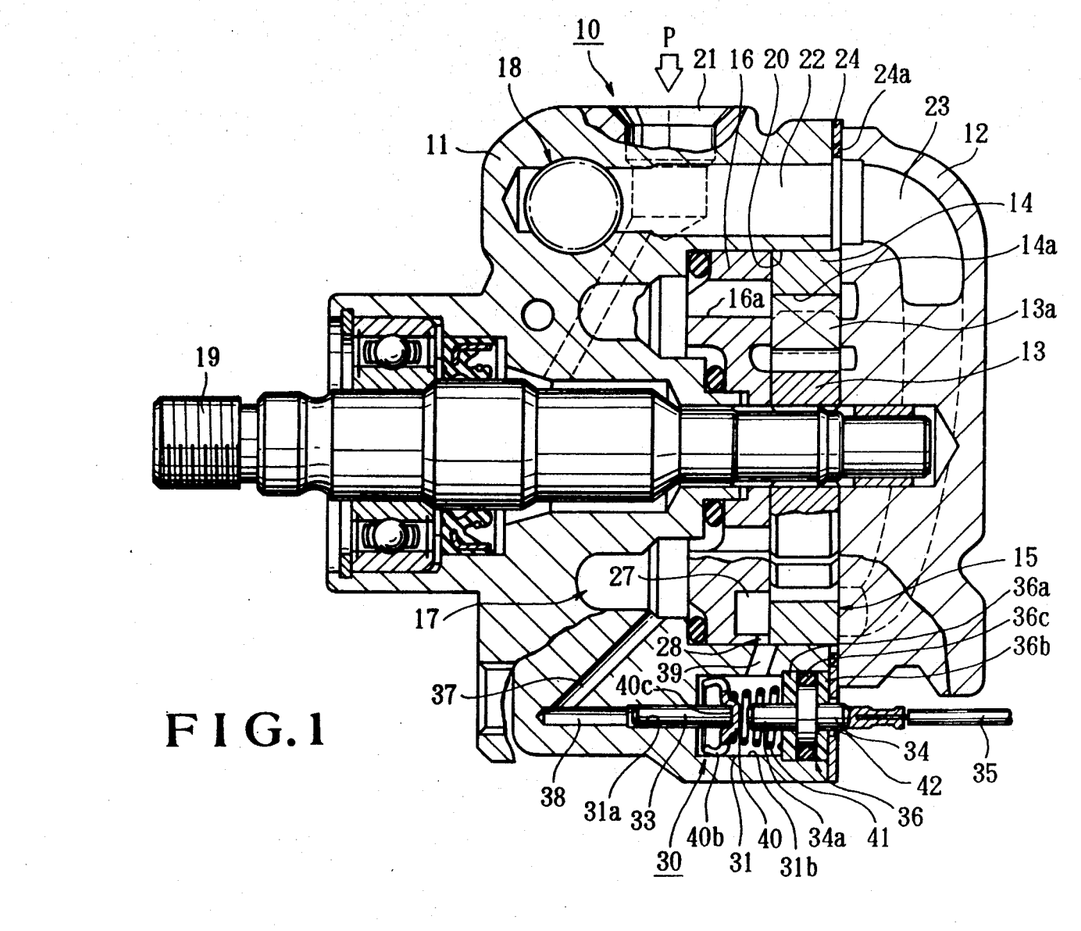
FIG. 1 is a sectional view showing a main part of an overall rotary pump with a pressure switch according to an embodiment of the present invention.
Figure 2:
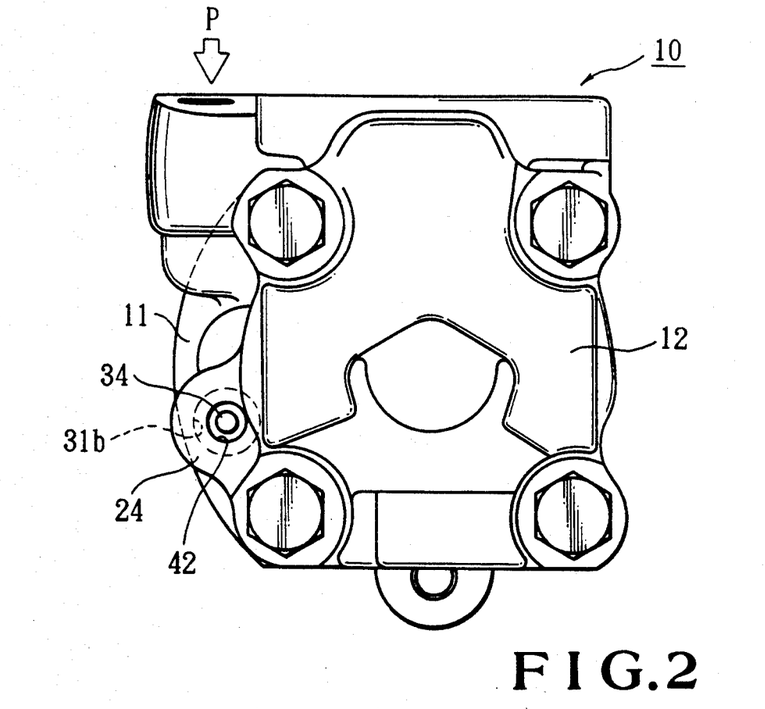
FIG. 2 is a side view of the pump viewed from its rear side.
Figure 3:
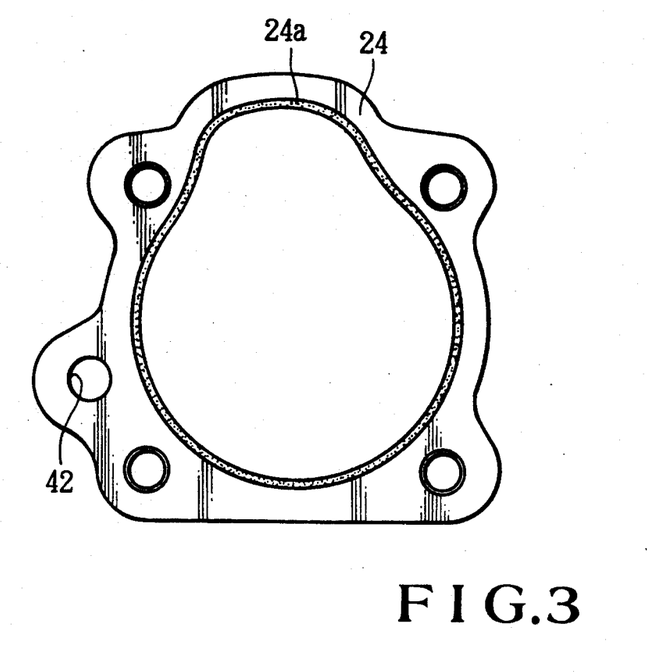
FIG. 3 is a schematic view of a gasket plate.

According to the characteristic feature of the present invention, the vane pump 10 described above has the following characteristic feature. A pressure switch mounting space 31 constituted by a small-diameter hole 31a having an inner end to which the fluid pressure of the pump outlet side is introduced, and a large-diameter hole 31b continuous with the small-diameter hole 31a and connected to the pump inlet side is formed in one end face, of the front body 11, to which the storage space 20 in which the vane 13a, the rotor 13, and the like are arranged is open, and to which the rear body 12 is joined through the gasket plate 24. More specifically, the space 31 is formed in an end face portion of the front body 11 to which the rear body 12 is not joined, so as to extend in the axial direction to be parallel to the rotating shaft 18 and the storage space 20. A plunger 33 consisting of a conductive material or the like is slidably held in the small-diameter hole 31a of the mounting space 31 in such a manner that the plunger 33 is normally biased toward the inner end side of the small-diameter hole 31a and can be moved toward the large-diameter hole 31b side depending on the magnitude of the fluid pressure of the pump outlet side. In addition, a terminal 34 consisting of a conductive material is held at an open end portion of the pressure switch mounting space 31 with a holding member 36 consisting of an insulating material so as to be kept insulated. An inner end 34a of the terminal 34 opposes an end portion, of the plunger 33, located on the large-diameter hole 31b side. A lead 35 extending from a switch circuit is connected to the outer end of the terminal 34. Furthermore, the removal of the terminal holding member 36 arranged in the mounting space 31 is prevented by the gasket plate 24 interposed between the bodies 11 and 12. With the above-described arrangement, a pressure switch 30 is integrally mounted in the pump 10.

Referring to FIG. 1, reference numerals 37 and 38 denote paths for introducing a pump outlet side fluid pressure from the pump outlet side pressure chamber 17 to the inner end of the small-diameter hole 31a; and 39, a path for connecting the large-diameter hole 31b to an outer surface portion, of the cartridge 15 in the pump mounting space 20, which is located on the pump inlet side (to an inlet side path groove 27, formed in the pressure plate 16 to oppose the pump chambers, through a connection groove 28 in this embodiment). With this arrangement, a pump outlet side pressure and a pump inlet side pressure are caused to act on the two ends of the plunger 33 serving as a movable portion of the pressure switch 30 so that when a pressure variation exceeding a predetermined value occurs, the plunger 33 is moved and brought into a contact with the terminal 34 so as to output a predetermined signal.

Figure 4:
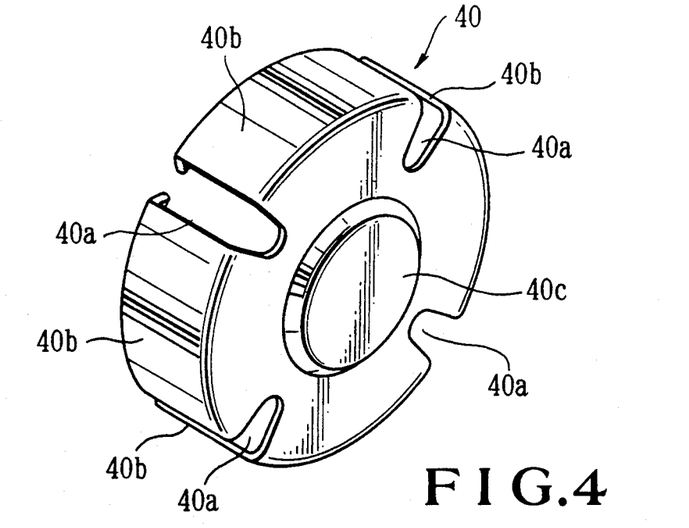
FIG. 4 is a schematic perspective view of a spring retainer at a pressure switch portion.

Reference numeral 40 denotes a spring retainer consisting of a conductive material. The spring retainer 40 is arranged at an end portion of the plunger 33 in the large-diameter hole 31b to allow a set spring 41 to be located between the plunger 33 and the holding member 36. In this embodiment, for example, as also shown in FIG. 4, the spring retainer 40 is formed such that a metal plate is bent to be formed into a substantially cup-like shape, and its circumferential portion is divided into a plurality of portions by slits 40a to form a plurality of elastic guide pieces 40b which are brought into slidable contact with the inner wall of the large-diameter hole 31b with a predetermined elastic force. In addition, reference numeral 40c denotes a contact end portion which is brought into contact with the inner end 34a of the terminal 34 upon movement of the plunger 33. The spring retainer 40 having such a structure can be easily formed by molding and hence is advantageous in terms of mass production.

Note that the holding member 36 for holding the terminal 36 comprises plates 36a and 36b constituted by a pair of insulating members sandwiching a flange portion of the terminal 34, and an O-ring 36c fitted on the flange portion. The holding member 36 constituted by these members is fitted in a large-diameter portion, of the opening portion of the large-diameter hole 31b, which is formed to have a slightly larger diameter than the remaining portion while the inner end side of the holding portion 36 is locked, and the holding portion 36 is pressed by the gasket plate 24.

Referring to FIG. 1, reference numeral 42 denotes an insertion opening formed in a portion, of the gasket plate 24, which seals an open end portion of the mounting space 31 of the pressure switch 30 so as to allow the terminal 34 to be inserted.

According to this arrangement, in the assembly of the pump 10, the pump rotating elements are mounted in the pump storage space 20 open to the end face of the front body 11, and the plunger 33 is mounted in the small-diameter hole 31a of the pressure switch mounting space 31 formed and open to be parallel to the axial direction. In addition, the spring retainer 40 and the set spring 41 for biasing the plunger 33 are mounted in the large-diameter hole 31b, and the insulating holding member 36 for holding terminal 34 is mounted in the open end portion of the large-diameter hole 31b. Thereafter, the rear body 12 is fixed to the front body 11 through the gasket plate 24 so that the open end portion of the pressure switch mounting space 31 is sealed by the gasket plate 24, which serves as a seal between the bodies 11 and 12, and the removal of the holding member 36 is prevented by the gasket plate 24. With this operation, the pressure switch 30 can be assembled. Subsequently, the lead 35 is connected to the outer end of the terminal 34. According to the pressure switch 30 having such a structure, when the plunger 33 is moved to be brought into contact with the terminal 34 with a variation in pump outlet side fluid pressure, a predetermined pressure switch signal can be output. In the pressure switch 30 having the above-described structure of this embodiment, when the contact end 40c of the spring retainer 40 is brought into contact with the terminal 34 by the plunger 33, the terminal 34 is electrically connected to and grounded by the front body 11 (consisting of a conductive material) through the spring retainer 40, thus obtaining a detection signal.

Figure 5:
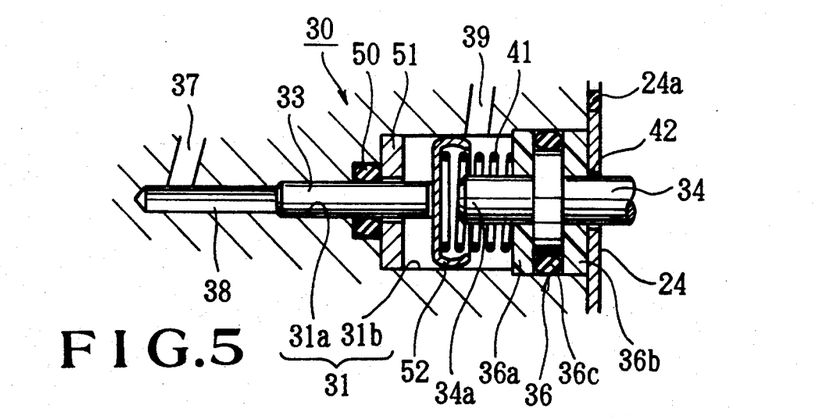
FIGS. 5 and 6 are schematic sectional views showing modifications of the pressure switch portion of the present invention.

The present invention is not limited to the structure of the embodiment described above. Various modifications of the shape and structure of each component of the pump 10, the structure of the pressure switch 30, and the like can be made. For example, as the pressure switch 30, a switch having an arrangement shown in FIG. 5 or 6 may be employed. FIG. 5 shows a case wherein an O-ring 50 is fitted on the plunger 33 in place of the elastic guide pieces 40b integrally formed with the spring retainer 40 in the above-described embodiment. Referring to FIG. 5, reference numeral 51 denotes a plate for sealing an annular groove in which the O-ring 51 is arranged; and 52, a cup-like spring retainer constituted by a metal plate member.

Figure 6:
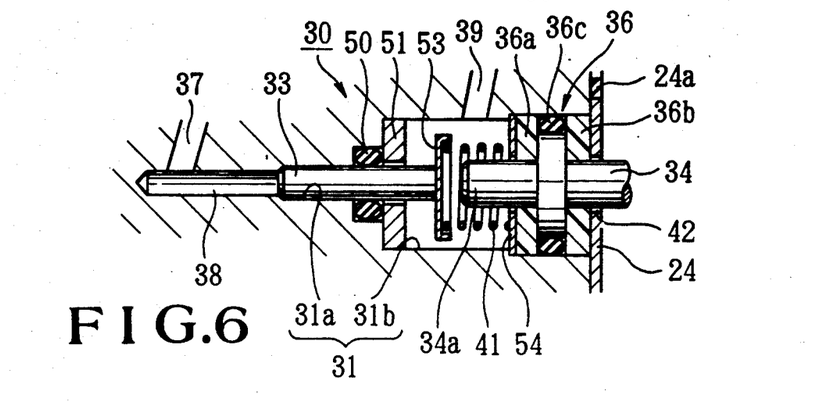

In the embodiment shown in FIG. 6, a spring retainer 53 having a smaller diameter than a large-diameter hole 31b is used. In this case, an electrical flow caused upon contact between a plunger 33 and a terminal 34 may be grounded to the pump body through the spring retainer 53, a set spring 41, and a conductive retainer 54 mounted on a holding member 36. In this case, it is apparent that the electrical flow may be grounded to the pump body through the spring retainer 53 and the plunger 33.

Figure 7:
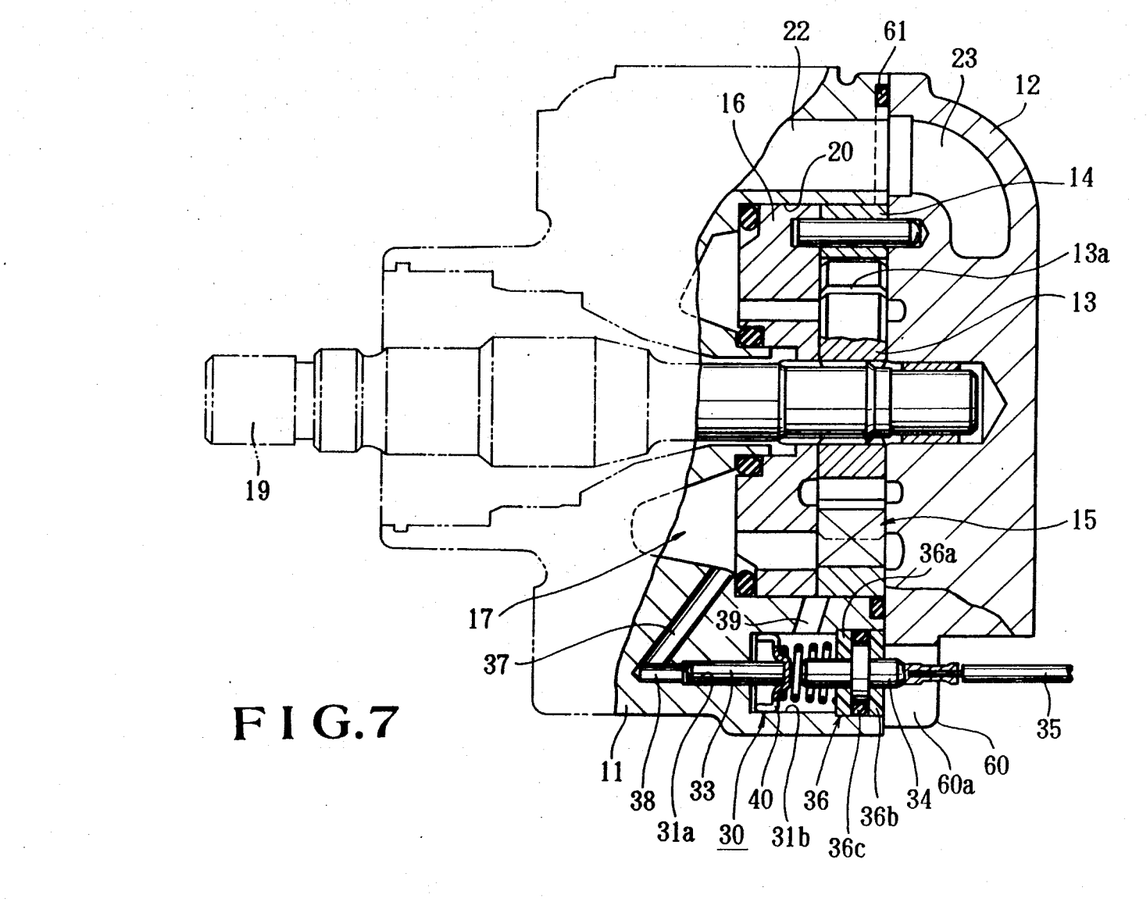
FIGS. 7 and 8 are a sectional view of a main part of a pump and a schematic view of the pump viewed from its rear side according to another embodiment of the present invention.
Figure 8:
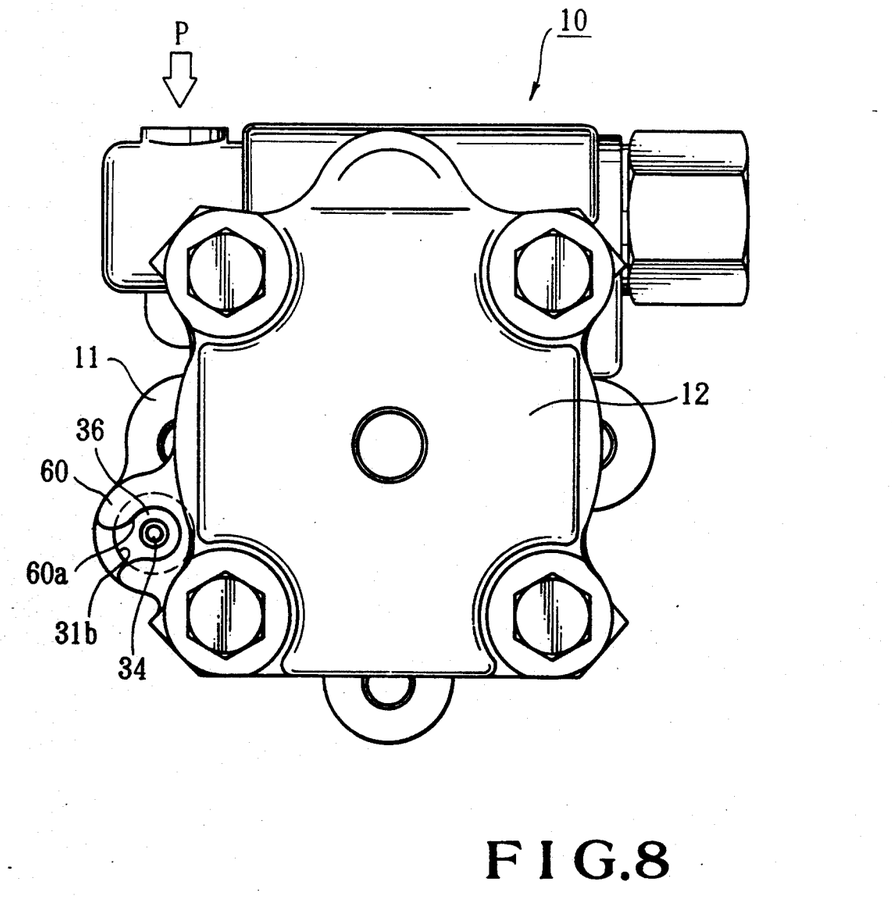

In the above-described embodiment, part of the gasket plate 24 is used to seal the open end of the pressure switch mounting space 31 formed in the front body 11. However, the present invention is not limited to this. It is apparent, as shown in FIGS. 7 and 8, that, in place of the gasket plate, a press portion 60 having a substantially U-shaped cut portion 60a serving as a clearance portion for a terminal 34 is formed at a portion of a rear body 12 to be directly pressed/held against the space 31. Referring to FIGS. 7 and 8, reference numeral 61 denotes an O-ring serving as a seal between the two bodies 11 and 12.

Figure 9:
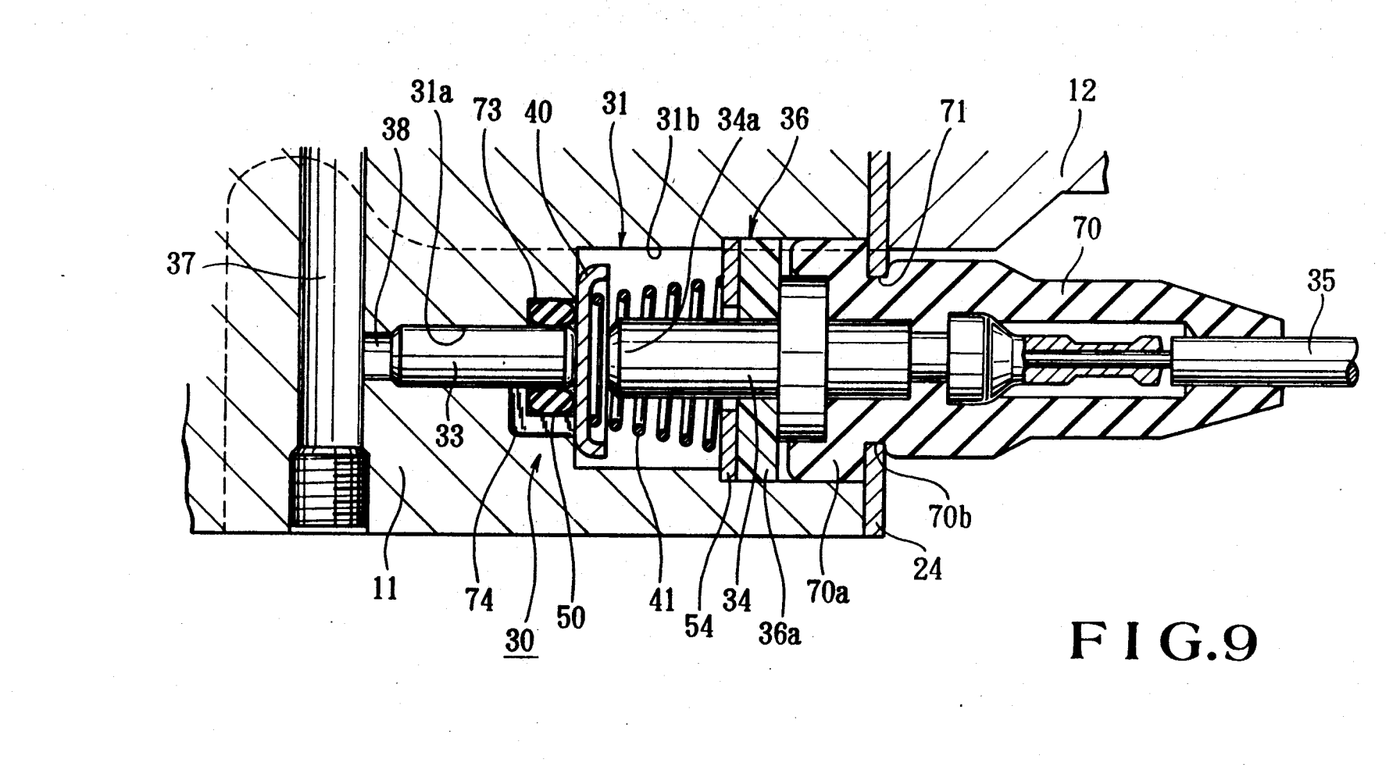
FIG. 9 is a sectional view showing still another embodiment of the present invention.

Furthermore, the pressure switch 30 described in the above embodiment may be integrally mounted in the pump body 11 as follows. As shown in FIG. 9, a cap member 70 consisting of an insulating elastic material (e.g., a rubber material) is fitted in the switch mounting space 31 in such a manner that the open end of the space 31 is sealed by a distal end portion 70a while the outer end of the terminal 34 extending through the holding member 36 arranged on the open end portion of the space 31 is held, and the lead 35 is kept in a water-tight state. In addition, the cap member 70 is positioned and fixed so as not to be removed, by engaging a groove portion 70b, formed in the outer surface of the cap member 70, with a substantially U-shaped notched portion 71 (similar to the U-shaped cut portion 60 of the body press member 60 in FIG. 8 described above) formed in a portion of the gasket plate 24 inserted between the two bodies 11 and 12. With this arrangement, the pressure switch 30 is integrally mounted in the pump body 11.

According to such an arrangement, the sealing cap member 70 consisting of an insulating elastic material is fitted in the mounting space 31 to seal its open end while the outer end of the terminal 34 is held and the lead 35 is kept in a water-tight state, and the cap member 70 is subsequently positioned and fixed so as not be removed, by the gasket plate 24 inserted between the two bodies 11 and 12, thereby assembling the pressure switch 30.

In such an arrangement, therefore, in spite of the use of the sealing cap member 70 which allows a small number of components and hence a low-cost structure, entrance of moisture in the pressure switch 30 can be reliably prevented. This prevents corrosion, disconnection, and undesired conduction due to moisture in the switch, or conduction between the terminal 34 and the body 11 or between the terminal 34, the gasket plate 24, and the body 11, thus ensuring a highly reliable structure as a switch. In this structure, when the plunger 33 is moved and brought into contact with the terminal 34 upon a variation in pump outlet side fluid pressure, the terminal 34 is electrically connected to the body 11 (consisting of a conductive material), so that a predetermined signal can be stably and reliably output from the pressure switch 30.

Referring to FIG. 9, reference numeral 73 denotes an annular groove which is formed in the open end portion, of the small hole 31a for holding the plunger 33, located on the large-diameter hole 31b side, to be open to the large-diameter hole 31b and is designed to hold an O-ring 50 for providing a hysteresis for the movement of the plunger 33 by means of friction; and 74, a pressure release groove for causing the large-diameter hole 31b constituting a low-pressure side fluid pressure chamber to communicate with an opposite side end face portion of the groove 73 while the O-ring 50 for providing a hysteresis for the movement of the plunger 33 is arranged in the annular groove 73 formed in an inner wall portion, of the small-diameter hole 31a, open to the end portion of the large-diameter hole 31b. The annular groove 74 is formed in a portion of the annular groove 73.

According to such an arrangement, fluid pressures acting on the two end sides of the O-ring 50 fitted in the annular groove 73 formed in the inner wall portion of the small-diameter hole 31a in the body 11 can be substantially equalized by the pressure release groove 74 to prevent distortion or the like of the O-ring 50, which cause an excessive sliding resistance as in the conventional arrangement. With this arrangement, therefore, a proper sliding resistance by friction is obtained, and a proper sliding operation of the plunger 33 can be ensured.

The present invention is not limited to a vane pump but can be applied to any type of rotary pump having a proper structure. In addition, the application of the present invention is not limited to a pump for a power steering apparatus but can be applied to pumps for various types of devices and apparatuses.

As has been described above, according the rotary pump with a pressure switch of the present invention, a pump body is constituted by a front body having one end face to which a storage space for storing pump rotating elements is open, and a rear body mounted on one end face of the front body through a sealing gasket plate to seal the storage space. A rotating shaft for driving the pump rotating elements extends through the front body. In this pump body, a pressure switch mounting space constituted by small- and large-diameter holes is formed in an end face portion of the front body to which the rear body is not joined, so as extend along the axial direction to be parallel to a rotating shaft. The fluid pressure of the pump outlet side is introduced to the inner end of the pump outlet side. The large-diameter holes is continuous with the small-diameter hole and is connected to the pump inlet side. A plunger is slidably held in the small-diameter hole of the mounting space in such a manner that the plunger is normally biased toward the inner end of the small-diameter hole and is slidably held to be movable toward the large-diameter hole side depending on the magnitude of the fluid pressure of the pump outlet side. In addition, a terminal is held/arranged at the open end portion of the pressure switch mounting space by using a holding member consisting of an insulating member while the terminal is kept in an insulating state. The inner end of the terminal opposes an end portion, of the plunger, located on the large-diameter hole side, and a lead from a switch circuit is connected to the outer end of the terminal. Furthermore, the removal of the terminal holding member arranged in the mounting space is prevented by a gasket plate inserted between the two bodies. In spite of such a simple arrangement, the pressure switch can be mounted in a dead space in the pump body. As compared with the conventional horizontal installation of a pressure switch, the arrangement of the present invention allows a decrease in protrusion amount of the pressure switch, and can achieve a reduction in size of a pump. In addition, the structure of the switch portion is simplified, and the number of components is minimized to improve the workability and the assembly performance, resulting in a great reduction in cost. In this manner, various practical advantages can be obtained.

In addition, according to the present invention, since the pressure switch mounting space is directly pressed by a press portion formed at a portion of the rear body to hold the components in the space, the number of components can be decreased, the workability and the assembly performance can be improved, and the cost can be reduced, in the same manner as described above.

What is claimed is:

1. In a rotary pump constituted by a front body having one end face to which a storage space for storing a pump rotating element is open, a rear body, mounted on one end face of said front body, for sealing the storage space, a gasket plate, inserted between said two bodies, for causing the storage space and said two bodies to communicate with each other, and a rotating shaft, arranged to extend toward said rear body through said front body, for rotating said pump rotating element, said rotary pump having a pressure switch, wherein a pressure switch mounting space constituted by a small-diameter hole and a large-diameter hole is formed in an end face portion of said front body to which said rear body is not joined, so as to be parallel to said rotating shaft, the small-diameter hole receiving a fluid pressure of a pump outlet side at an inner end thereof, and the large-diameter hole being formed to be continuous with the small-diameter hole and connected to a pump inlet side;

a plunger is slidably arranged in the small-diameter hole of the mounting space;

said plunger is normally biased toward the inner end of the small-diameter hole and is kept movable toward the large-diameter hole depending on a magnitude of the fluid pressure of the pump outlet side;

a pressure detector is arranged to be operated when the fluid pressure of the pump outlet side exceeds a predetermined value;

said pressure detector includes a terminal arranged in the large-diameter hole and having an inner end opposing an end portion, of said plunger, located in the large-diameter hole, and an outer end connected to a lead from a switch circuit, and a holding member for holding said terminal at an open end portion of the pressure switch mounting space while keeping said terminal insulated; and removal of a terminal holding member arranged in the mounting spacer is prevented by said gasket plate inserted between said two bodies.

2. A pump according to claim 1, wherein said plunger includes a spring retainer which slides on an inner wall of the large-diameter hole.

3. A pump according to claim 1, further comprising a spring arranged between said plunger and said insulating holding member, and
   wherein a pressure with which said plunger is brought into contact with said terminal is set by using said spring.

4. A pump according to claim 3, wherein said plunger includes a spring retainer which slides on an inner wall of the large-diameter hole and receives said spring at one end thereof.

5. A pump according to claim 1, wherein an annular groove is formed in an inner wall of the small-diameter hole to store an O-ring which is brought into slidable contact with said plunger.

6. A pump according to claim 5, further comprising a pressure release groove for causing a portion, located farther from the large-diameter hole than said O-ring in the small-diameter hole, to communicate with the large-diameter hole.

7. A pump according to claim 1, wherein said gasket plate has a notched portion serving as a clearance portion for said terminal.

8. A pump according to claim 7, wherein said terminal is covered by a sealing cap fitted in the notched portion of said gasket plate.

9. In a rotary pump constituted by a front body having one end face to which a storage space for storing a pump rotating element is open, a rear body, mounted on one end face of said front body, for sealing the storage space, and a rotating shaft, arranged to extend toward said rear body through said front body, for rotating said pump rotating element, said rotary pump having a pressure switch, wherein
   a pressure switch mounting space constituted by a small-diameter hole and a large-diameter hole is formed in an end face portion of said front body to which said rear body is not joined, so as to be parallel to said rotating shaft, the small-diameter hole receiving a fluid pressure of a pump outlet side at an inner end thereof, and the large-diameter hole being formed to be continuous with the small-diameter hole and connected to a pump inlet side;
   a plunger is slidably arranged in the small-diameter hole of the mounting space;
   said plunger is normally biased toward the inner end of the small-diameter hole and is kept movable toward the large-diameter hole depending on a magnitude of the fluid pressure of the pump outlet side;
   a pressure detector is arranged to be operated when the fluid pressure of the pump outlet side exceeds a predetermined value;
   said pressure detector includes
   a terminal arranged in the large-diameter hole having an inner end opposing an end portion, of said plunger, located in the large-diameter hole, and an outer end connected to a lead from a switch circuit, and
   a holding member for holding said terminal at an open end portion of the pressure switch mounting space while keeping said terminal insulated; and
   removal of a terminal holding member arranged in the mounting space is prevented by a press portion formed at a portion of said rear body.

10. A pump according to claim 9, wherein said plunger includes a spring retainer which slides on an inner wall of the large-diameter hole.

11. A pump according to claim 9, further comprising a spring arranged between said plunger and said insulating holding member, and
    wherein a pressure with which said plunger is brought into contact with said terminal is set by using said spring.

12. A pump according to claim 11, wherein said plunger includes a spring retainer which slides on an inner wall of the large-diameter hole and receives said spring at one end thereof.

13. A pump according to claim 9, wherein an annular groove is formed in an inner wall of the small-diameter hole to store an O-ring which is brought into slidable contact with said plunger.

14. A pump according to claim 13, further comprising a pressure release groove for causing a portion, located farther from the large-diameter hole than said O-ring in the small-diameter hole, to communicate with the large-diameter hole.

15. A pump according to claim 9, wherein said press portion has a cut portion serving as a clearance portion for said terminal.

* * * * *